April 29, 1969 — F. B. STARK ET AL — 3,441,658
CERAMIC INSULATOR IN CABLE CONNECTIONS
Filed April 29, 1966
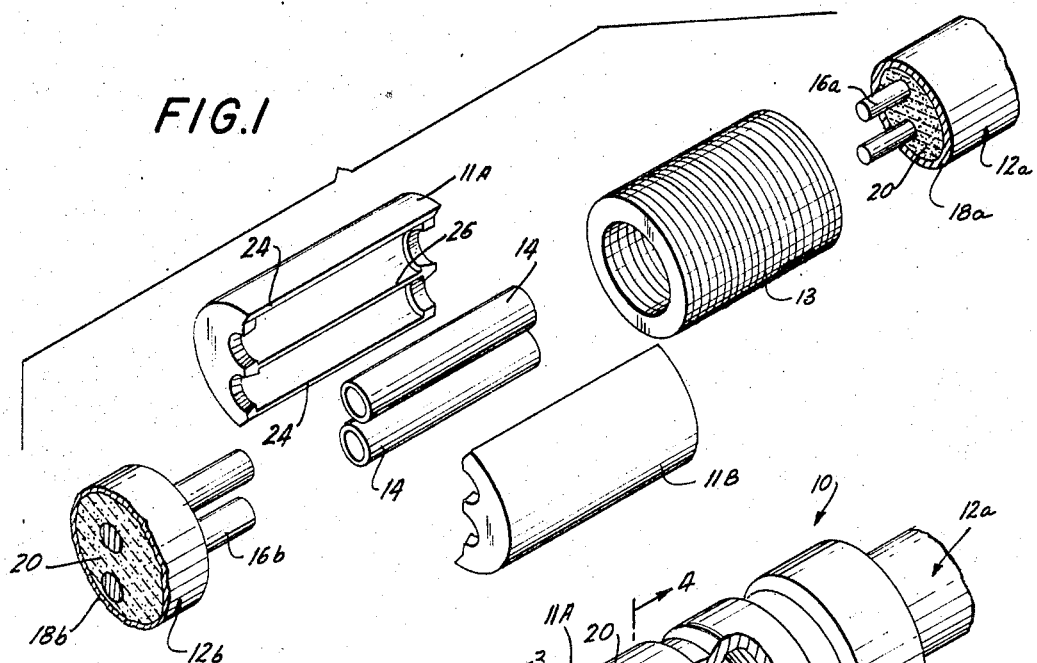
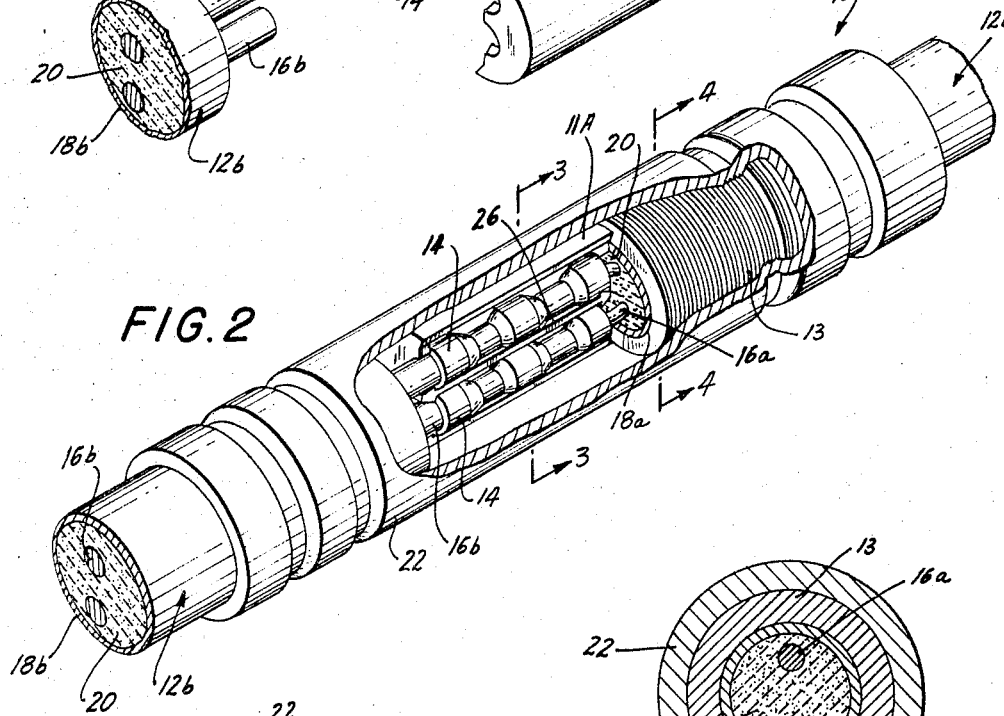
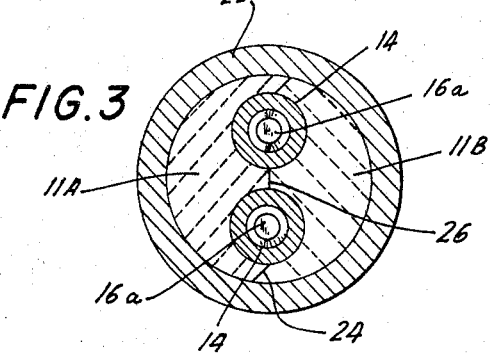
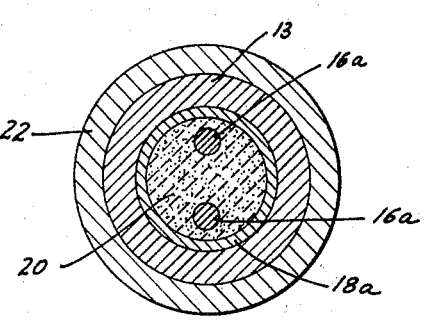
INVENTOR
FRANK BENJAMIN STARK
DONALD LEE SMITH
BY
Curtis, Morris + Safford
ATTORNEYS United States Patent Office 3,441,658
Patented Apr. 29, 1969

3,441,658
CERAMIC INSULATOR IN CABLE CONNECTIONS
Frank Benjamin Stark, Wormleysburg, and Donald Lee Smith, Middletown, Pa., assignors to AMP Incorporated, Harrisburg, Pa.
Filed Apr. 29, 1966, Ser. No. 546,316
Int. Cl. H02g 15/02, 15/08
U.S. Cl. 174—88                    3 Claims

ABSTRACT OF THE DISCLOSURE

An insulating device useful within electrical connection for joining metal shielded cable. The insulating device being formed of a dielectric ceramic shaped to mate together to rigidly space and insulate internal connections between the cable conductors. This insulating device and the resulting connection are particularly useful in joining metal sheathed mineral-insulated electrical cable. This device is typically formed of two mating half shells which form a cylindrical insulator closely enclosing and positioning the internal cable conductor connections.

---

The present invention relates to electrical crimp-type connectors. More particularly it pertains to solderless connectors, and the resulting connections, incorporating insulators made of solid refractory materials. These connectors are particularly useful for metal-sheathed, mineral insulated cables or the like to give strong, corrosion resistant connections with excellent electrical properties and stability over a wide range of temperature extremes.

The expression mineral-insulated cable, as used herein, denotes a type of electrical cable or conduit comprising a seamless tubular metallic sheath, usually copper or aluminum, which houses one or more conductors, the latter being maintained in a spaced insulated relationship to each other and to the sheath by an especially electrically inert refractory mineral substance, such as highly compressed powdered magnesium oxide. This type of cable is not only very resistant to moisture and various fluids, but is also highly resistant to the effects of temperature changes. MI cables with mild steel, stainless steel, and Inconel sheaths are available for temperatures up to 450, 700, and 1100° C., respectively.

These properties make this type of cable highly desirable for use under hazardous, corrosive, very damp, or other conditions where its particular properties can be specially utilized, e.g., in various marine applications or as heating cable or nonarcing cable in chemical processing plants. Since these conductors are entirely enclosed, they eliminate any chance of exposed arcing or attack by moisture. Unfortunately, this type of cable is very difficult to splice or otherwise terminate and still maintain the desirable properties of the cable.

Many of the problems and prior art attempts to meet these problems are set forth in Patent No. 3,146,299. One of the major problems there discussed is the overheating of the earlier terminations due to their poor thermal conductivity, often resulting in a deterioration of the useful life of the electrical properties, and of the useful applications of the cable as a whole. That patent teaches a tamping technique for loose powdered magnesium oxide in an attempt to approximate condition of the mineral insulation of the cable.

Powdered magnesium oxide, whether in tamped or loose form, is extremely hygroscopic. For example, mineral insulated cable is quite capable of rapidly drawing water up to six inches along the cable. Therefore, it requires great care during the formation of any connection. Any of the prior art techniques calling for loose powdered magnesium oxide are cumbersome not only because of the difficulties of hand-filling the powder prior to tamping, but also because of the general need to employ a hot plate to keep the powder dry, especially in the field.

A still further drawback of both the air-gap splice and the loose powder splice (tamped or not) is the lack of a maintained mechanical separation by the dielectric to ensure uniform insulation between conductors.

Mineral insulated cable and crimp-type connectors have both existed commercially for well over thirty years and have been extensively available for at least twenty years. Despite this, the foregoing problems have persisted unsolved.

Consequently, it is an object of this invention to provide a termination capable of overcoming the many problems and drawbacks of the prior art discussed herein.

More specifically, it is a further object to provide simple terminations which can be made in the field quickly with a minimum of skill and without cumbersome or complex equipment or techniques.

Another object is to provide terminations which are physically compact, and, as an attribute thereof, are not as subject to overheating.

Still another object is to provide connectors which are good heat sinks having superior thermal conductivity and are heat resistant so that they have greater electrical load capacities, especially when compared to those employing organic insulating materials.

Yet another object is that the component parts of the applied connector be substantially non-hydroscopic.

A still further object is to provide a connection having good electrical characteristics such as an insulator with superior dielectric strength, which connection is also capable of withstanding thermal shock (i.e., extreme and abrupt temperature changes), and even irradiation, and remaining mechanically strong and dielectrically stable.

Additional objects are to provide a termination which maintains a substantially uniform spacing of one conductor from other conductive elements therein and closely to approximate for all conductive elements of the termination the environment of the cable to which it is applied.

Other objects and attainments of the present invention will become apparent to those skilled in the art upon a reading of the following detailed description when taken in conjunction with the drawings in which there is shown and described a preferred embodiment of the invention; it is to be understood, however, that this embodiment is not intended to be exhaustive nor limiting of the invention, but is given for purposes of illustration in order that others skilled in the art may more fully understand the invention and the principles thereof and the manner of applying it in practical use so that they may modify it in various forms, each as may be best suited to the conditions of a particular use.

In the drawings:

FIGURE 1 is an exploded perspective view of internal elements of our preferred embodiment;

FIGURE 2 is an assembled perspective view, shown partially cut away to expose the interior;

FIGURE 3 is a vertical section taken along lines 3—3 in FIGURE 2; and

FIGURE 4 is a vertical section taken along lines 4—4 in FIGURE 2.

The preferred embodiment of this invention is illustrated in the drawings as a connection 10. It is here shown for purposes of demonstrating its versatility as splicing MI cable 12 having different outside diameters and different conductor sizes. A stepping bushing 13 (such as disclosed in patent application Ser. No. 316,552; filed Oct. 16, 1963) serves to accommodate the different size cables 12. It will be readily appreciated that the preformed, non-hydroscopic ceramic insulator 11 being shaped in sections adapted to fit about the crimped internal metalic sleeves 14 splicing the conductors 16 result in a great simplification of field assembly techniques for MI cable splices.

All known loose powdered mineral insulation splices invariably reduced the overall quality of the MI cable because in order to have sufficient room to tamp properly the connector would be too bulky. With smaller splices the minimal clearances between the outer covering and the internally spliced cables prevented even and complete tamping. Furthermore, as a practical matter the quality of each such connection depended upon the skill and patience of the men in the field. The result with these prior techniques was a substantial percentage of connections with air gaps where the powder would fall away causing hot spots capable of burning out the cable.

The use of a preformed ceramic insulator having the properties set forth below removes the human variable and results for the first time in this field in a MI cable connection which can consistently have properties truly equivalent and even superior to the cable itself.

The various parts of the connection 10 are assembled by cutting back the cables 12 to expose the conductors 16 sufficiently to enable them to be spliced and to accommodate the insulator 11. Remove any burrs resulting from cutting the sheath 18. Clean the mineral insulation 20 from the exposed conductors 16. Slide bushings 13 over either or both cables 12 where required. Note that two bushings may be used on the small size cables so that the remainder of the connection 10 can be made from standard parts. This results in a saving in both manufacturing costs and in field inventory costs. This is possible because a connection 10, made according to the present invention, will have sufficient heat conductivity, etc. to permit the use of a bulkier connection (which, although bulkier, may nevertheless have desirable properties at least equivalent to the cable).

Next the outer shell 22, usually of a material similar to the sheath 18, is slid over either cable 12. The splicing sleeves 14 are crimped onto the conductors 16, preferably the larger conductors first for ease of handling. Note that if the conductors 16a and 16b are of a different size, then advantageously the contacts 14 may have correspondingly sized bores. Advantageously, the internal sleeves 14 are crimped so that substantial uncrimped portions remain round to maintain good contact over a fairly large area between the insulator 11 and the contacts 14 thereby to facilitate heat conduction.

The halves of the ceramic insulator 11 are placed over the crimped contacts. They are hollowed to fit closely around the sleeves 14. In the preferred embodiment, these halves 11A and B have mating longitudinal lips 24 angled inwardly at one side and outwardly at the other side. The major purpose of this inventive feature is to increase the length of the thin air gap between these mating lip surfaces thereby increasing the air path between the conductors 16 and the outer shell 22 which in turn increases the dielectric strength of the connection 10. This means that the mass of the insulator 11 can be reduced resulting in a more compact connection which more readily dissipates heat. The same feature can be applied to the interfaces 26 which join between the sleeves 14. A secondary advantage of these beveled lips 24 is that the halves 11A and 11B become polarized so that they can be mated only one way. This is an advantage if the holes in the insulator accommodating the conductors 16 are of different sizes at either end. Note also that the holes are also tapered to accommodate the conductors 16a being spread apart to fit into the insulator 11.

With the insulator in place, the outer shell 22 is centered over the splice area. This can be aided by scribing a mark on a cable where the end of the shell should come. Finally, the bushings 13 are slid under the end of the shell 22 and both ends of the shell 22 are crimped to the cable sheath 18 (including any bushings where present). See FIGURE 2. Three O-crimps have been found most advantageous.

The insulator 11 is not in as overall intimate contact with the splicing sleeves 14, the conductors 16, and the outer shell 22 as would be tamped mineral insulation. However, there is not the need for such overall contacts (even where heat dissipation from the connection is important) because one of the inventive features of the present invention is in the realization by the applicants that by employing solid, preformed, non-hydroscopic, refractory materials which have a heat conductivity substantially equivalent to compressed powdered magnesium oxide in an efficient compact design, then a connection having desirable properties approximating those of MI cable can be quickly, simply, and reliably assembled without any difficult or unusual techniques.

Alumina ($AL_2O_3$), steatite ($MgO \cdot SiO_2$), and forsterite ($2MgO \cdot SiO_2$) are all ceramics which are particularly exemplary of the materials from which the insulator 11 is most advantageously made, especially where heat considerations are important. These are mechanically strong, nonhydroscopic, greatly superior heat conductors compared to the organic insulators (polyvinyl chloride, polytetrafluoroethylene, etc.) and to magnesium oxide in loose or pressed form.

For purposes of comparison the thermal conductivity of various insulators are set forth (in calories —cm./sec. —$cm.^2$ ° C.):

| K | Insulator | Measured at— |
| --- | --- | --- |
| 0.0400 (0.0200) | Alumina | 300° (800°). |
| 0.0060 | Steatite | 300°. |
| 0.0080 | Forsterite | 300°. |
| 0.0002 (0.0005) | Loose MgO | 50° C. (1,130°). |
| 0.0027 (0.0072) | Brick MgO | 50° C. (1,130°). |
| 0.0006 | Polytetrafluoroethylene | |
| 0.0004 | Polyvinyl chloride | |
| 0.0006 | Nylon | |

These preferred ceramics not only have the required thermal conductivities but also resistance to heat shock (especially alumina) and a mechanical strength to resist chipping, fracture, or crumbling which might endanger the quality of the splice.

A commercial form of the present invention has the following typical dimensions: a contact 0.75 inch long with an 0.125 inch diameter fits into an insulator about 0.88 inch long with a diameter of 0.37 inch and two hollows each having a radius of 0.065 inch which are designed to receive said contacts. The lips 24 are at 45° to the flat face and the taper to the lead holes is 30° to the longitudinal axis.

The basic inventive concept here disclosed and claimed is intended in its broader aspects to apply to end terminations for MI cable. It is also intended to apply to insulators made up of more than two sections in order to terminate MI cable and the like which have more than two conductors.

We claim:
1. An electrical connection joining conductors of metal-sheathed, mineral insulated cables comprising at least one internal sleeve joining said conductors, an insulator covering each sleeve and adjacent portions of said conductors, an outer shell covering said insulator and said sheathing at either end of said connection and being crimped into a mechanically strong vapor tight seal, said insulator comprising preformed sections made from a nonhydroscopic, dielectric, refractory material, said sections being shaped to join together about all internal sleeves to space them from any adjacent conductive elements by the refractory material of said sections, the mating faces of said sections being large enough and the lead holes for said conductors into said sleeves being long enough to prevent voltage breakdown between any sleeve and adjacent conductive elements.

2. A connection as claimed in claim 1 for use on mineral-insulated heater cables wherein said refractory material is a mechanically strong, solid ceramic having a thermal conductivity and giving a dielectric strength of at least substantially the same order as the mineral insulation of the mineral insulated cable and wherein said sections fit reasonably closely about any sleeve within said termination whereby heat conduction through said insulator is substantially maximized.

3. An electrical connection splicing conductors of externally metal - sheathed, internally mineral - insulated cables comprising a sleeve crimped to splice said conductors, an insulator covering each sleeve and adjacent portions of said conductors, an outer shell covering said insulator and said sheathing at either end of said connection and being crimped into a mechanically strong vapor tight seal, said insulator comprising identical preformed sections made from a nonhydroscopic, dielectric, mechanically strong solid ceramic having a thermal conductivity and giving a dielectric strength of at least substantially the same order as the mineral insulation of the mineral insulated cable, each of said sections being shaped as a cylindrical half-shell with hollows to closely receive said sleeve and space it from any adjacent conductive elements, the mating faces joining said sections being beveled to extend these interfaces enough and the lead holes for said conductors being long enough to prevent voltage breakdown between said sleeve and adjacent conductive elements.

References Cited

UNITED STATES PATENTS

| 288,311 | 11/1883 | Cobb | 174—92 |
| 433,922 | 8/1890 | Wiley et al. | 174—84 |
| 1,519,108 | 12/1924 | Brooke. | |
| 2,424,008 | 7/1947 | Wayman | 174—155 |

DARRELL L. CLAY, *Primary Examiner.*

U.S. Cl. X.R.

174—77; 29—628; 338—239